(12) United States Patent
Jenkins (10) Patent No.: US 6,616,173 B2
(45) Date of Patent: Sep. 9, 2003

(54) STARTING APPARATUS FOR DIRECT DRIVE GO-CART

(76) Inventor: Henry H. Jenkins, 602 Parsons Dr., Medford, OR (US) 97501

( * ) Notice: Subject to any disclaimer, the term of this patent is extended or adjusted under 35 U.S.C. 154(b) by 0 days.

(21) Appl. No.: 10/000,378

(22) Filed: Oct. 31, 2001

(65) Prior Publication Data

US 2003/0080537 A1 May 1, 2003

(51) Int. Cl.[7] .................................................. B62B 1/06
(52) U.S. Cl. ............... 280/651; 280/47.131; 280/47.17; 280/47.24; 414/490
(58) Field of Search ................................. 414/453, 454, 414/444, 490, 639; 280/651, 47.131, 47.17, 47.24, 47.27, 47.28, 47.29, 79.11

(56) References Cited

U.S. PATENT DOCUMENTS

| | | | | |
|---|---|---|---|---|
| 3,052,323 A | * | 9/1962 | Hopfeld | 187/232 |
| 3,647,238 A | * | 3/1972 | Mackey | 280/47.29 |
| 3,873,118 A | * | 3/1975 | Takagi | 280/47.2 |
| 3,878,958 A | * | 4/1975 | Ring | 414/490 |
| 4,728,245 A | * | 3/1988 | Shelton | 414/490 |
| 5,120,183 A | * | 6/1992 | Phillips | 414/490 |
| 5,256,025 A | * | 10/1993 | Williamson | 414/490 |
| 5,290,051 A | * | 3/1994 | Olson | 280/47.27 |
| 5,474,416 A | * | 12/1995 | Rogge et al. | 414/482 |
| 5,624,224 A | * | 4/1997 | Brandenburg | 414/490 |
| 5,860,485 A | * | 1/1999 | Ebbenga | 180/19.2 |
| 5,913,373 A | * | 6/1999 | Forrest | 180/6.2 |
| 5,971,693 A | * | 10/1999 | Story et al. | 414/490 |
| 6,106,215 A | * | 8/2000 | Goulet | 414/538 |
| 6,131,927 A | * | 10/2000 | Krawczyk | 280/47.29 |
| 6,227,789 B1 | * | 5/2001 | Williamson | 414/490 |

* cited by examiner

Primary Examiner—Brian L. Johnson
Assistant Examiner—Kelly E Campbell
(74) Attorney, Agent, or Firm—Woodling, Krost and Rust (57) ABSTRACT

Apparatus for starting a direct drive go-cart which includes a frame having front and rear end portions as well as a handle portion. Wheels are attached to the front and rear end portions of the frame for moving the apparatus along a road or track. The front end portion is provided with a rotatable shaft to which is attached an engagement member or holding member which is adapted to engage a go-cart to lift the rear end of the same off of the ground. The shaft and the engagement member are movable between latched and unlatched positions to either hold a go-cart or release the same. A latchable member is operatively connected to the shaft and when latched holding the engagement member in latched condition to keep the rear end of a go-cart off of the ground. A latch member serves to hold the latchable member in latched condition and is connected to the latch member to release it from the latched condition. The rear frame portion is pivotally connected to the frame so that it can be moved relative thereto to a more compact configuration for storage or transportation.

3 Claims, 10 Drawing Sheets

STARTING APPARATUS FOR DIRECT DRIVE GO-CART

BACKGROUND OF THE INVENTION

The present invention relates in general to starting apparatus for starting high compression direct drive go-carts.

High compression direct drive go-carts are quite popular however they suffer from the difficulty that they are extremely hard to start. The methods used to start them vary and include a driver pushing his vehicle as rapidly as possible and then jumping in when the engine turns over. Sometime one or two individuals will push the vehicle with the driver in place and sometime the individuals will lift the back of the vehicle off of the ground, run with it and then drop it causing inertia to start the vehicle.

The present invention has as an object an apparatus to conveniently and efficiently start a direct drive go-cart.

Another object of the invention is to provide an apparatus for lifting the rear end of a go-cart and propelling it along a track and when sufficient speed has been obtained dropping the rear end causing the wheels via the drive shaft to start the engine.

A still further object of the invention is to provide an apparatus for starting a direct drive go-cart which apparatus can be folded to a compact condition for storage and transportation.

Other objects and a fuller understanding of the invention may be had by referring to the following description and claims taken in conjunction with the accompanying

DETAILED DESCRIPTION OF THE INVENTION

The apparatus of the invention for starting a go-cart is generally illustrated in FIGS. 1–4 of the drawings and is identified by the reference numeral 20. The apparatus includes a frame 24 which has front and rear end portions 28 and 30 as well as a handle portion 32. A handle member 34 is mounted to the handle portion 32 of the frame 24. The front end frame portion 28 has a first laterally extending support member 38 with first and second portions 40 and 41. Ground engaging wheels 43 and 44 are attached to the first and second portions 40 and 41 respectively. The rear end frame portion 30 has a second laterally extending support member 46 with third 48 and fourth 49 portions respectively. Ground engaging wheels 52 and 53 are respectively attached to the first and second portions 48 and 49.

Figure 1:
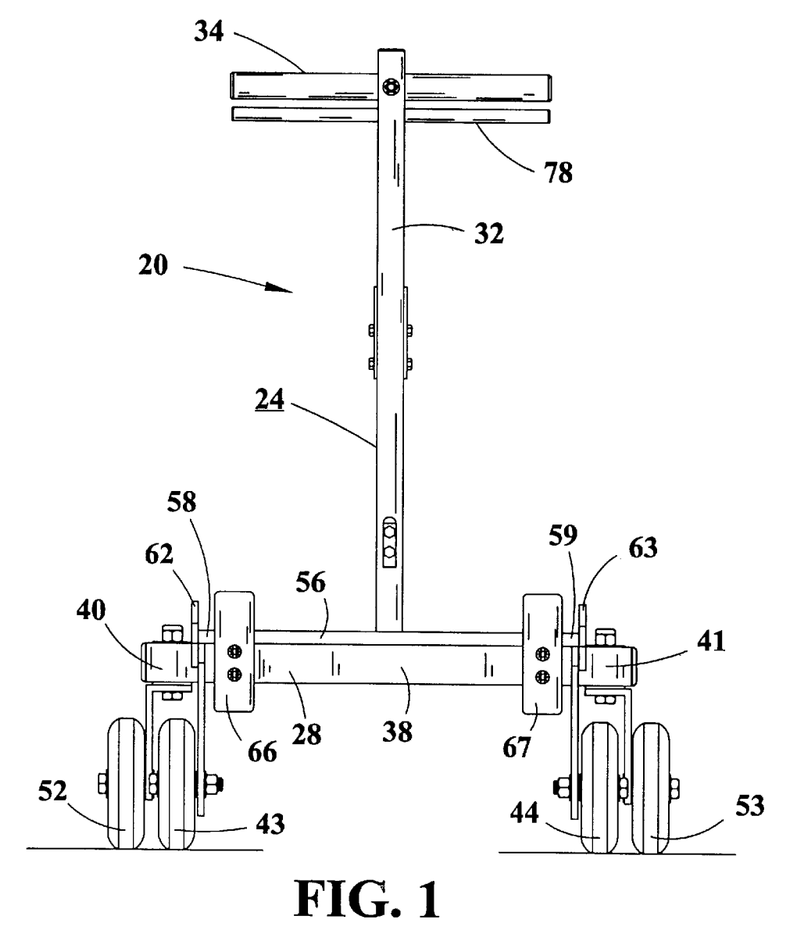
FIG. 1 is a front view of the apparatus of the present invention
Figure 2:
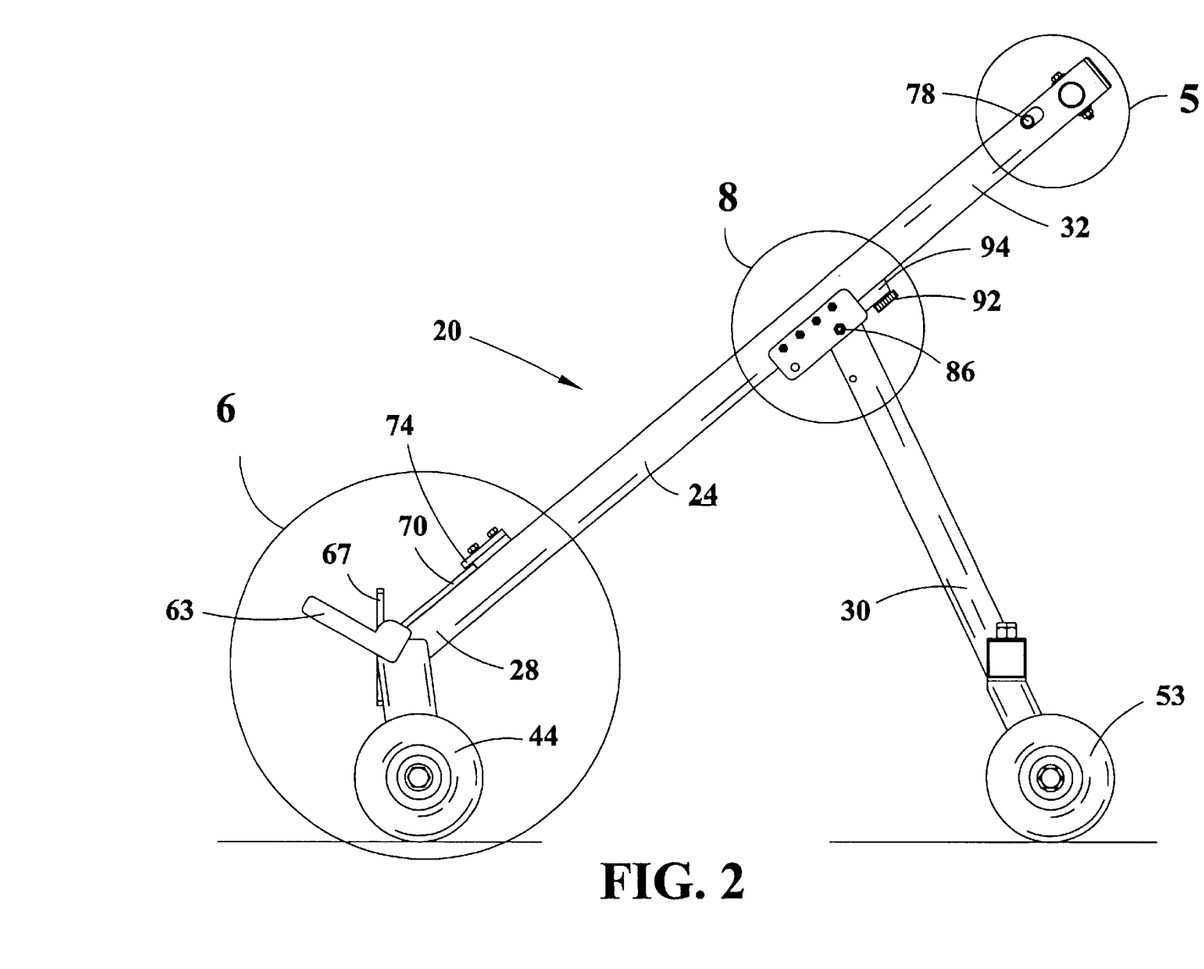
FIG. 2 is an elevational view taken from the right side of FIG. 1.
Figure 3:
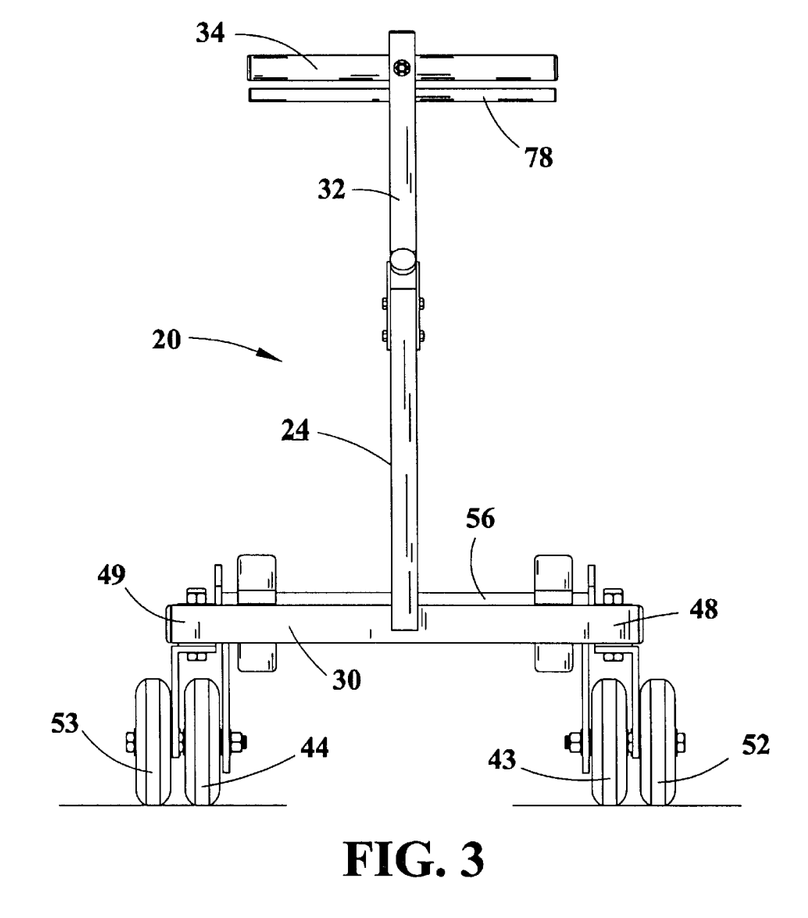
FIG. 3 is a rear view of the apparatus shown in FIG. 1.
Figure 4:
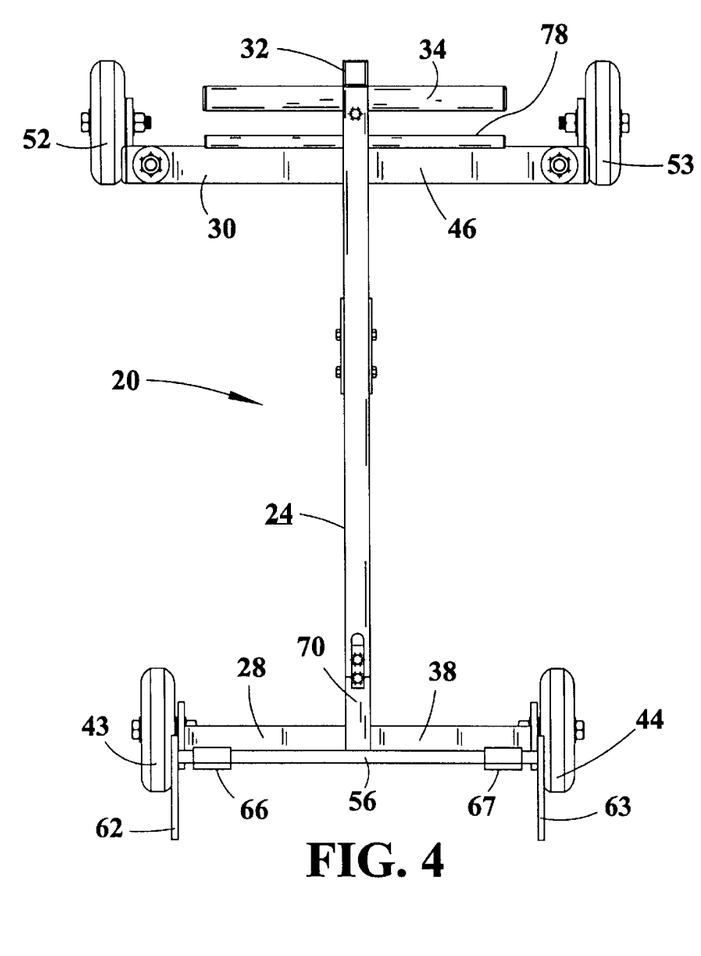
FIG. 4 is a plan view of the apparatus shown in FIG. 1.
Figure 5:
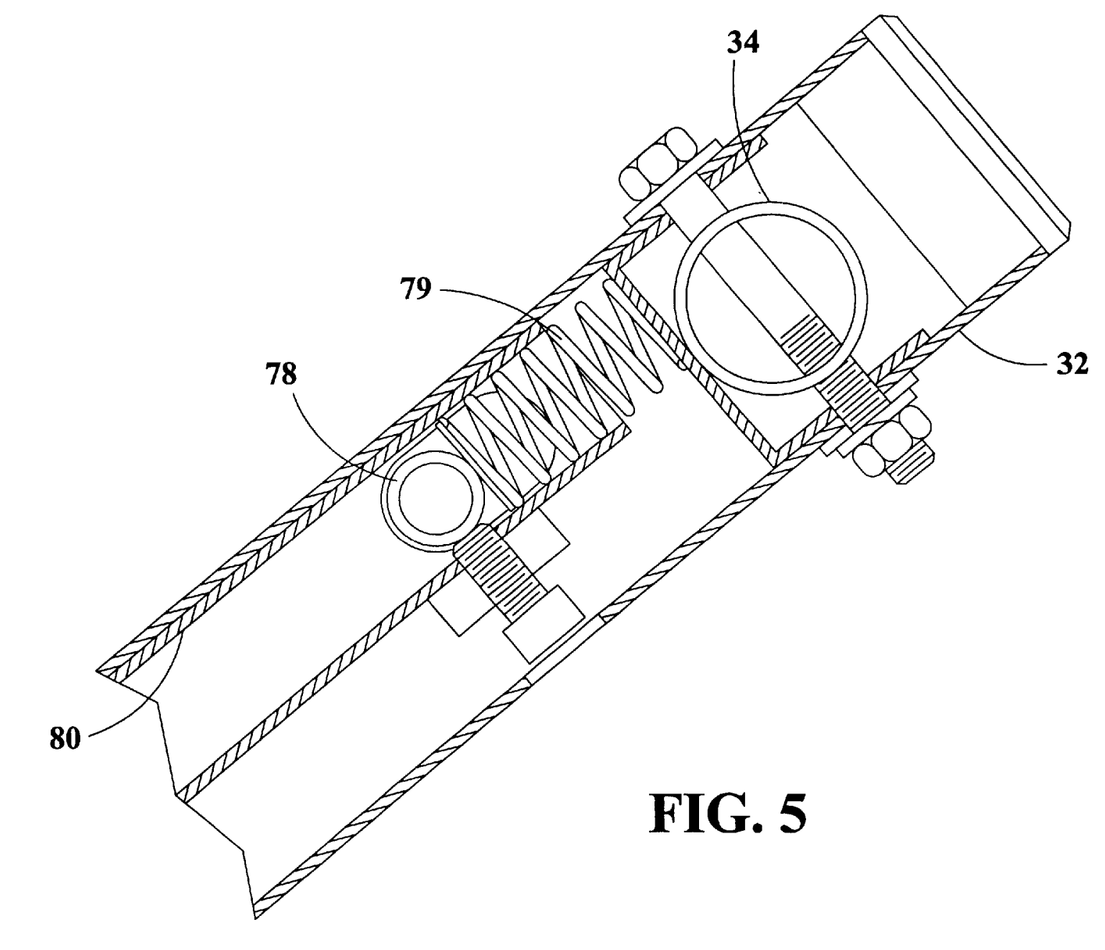
FIG. 5 is an enlarged view of the portion of FIG. 2 shown in the circle identified by the number 5.
Figure 6:
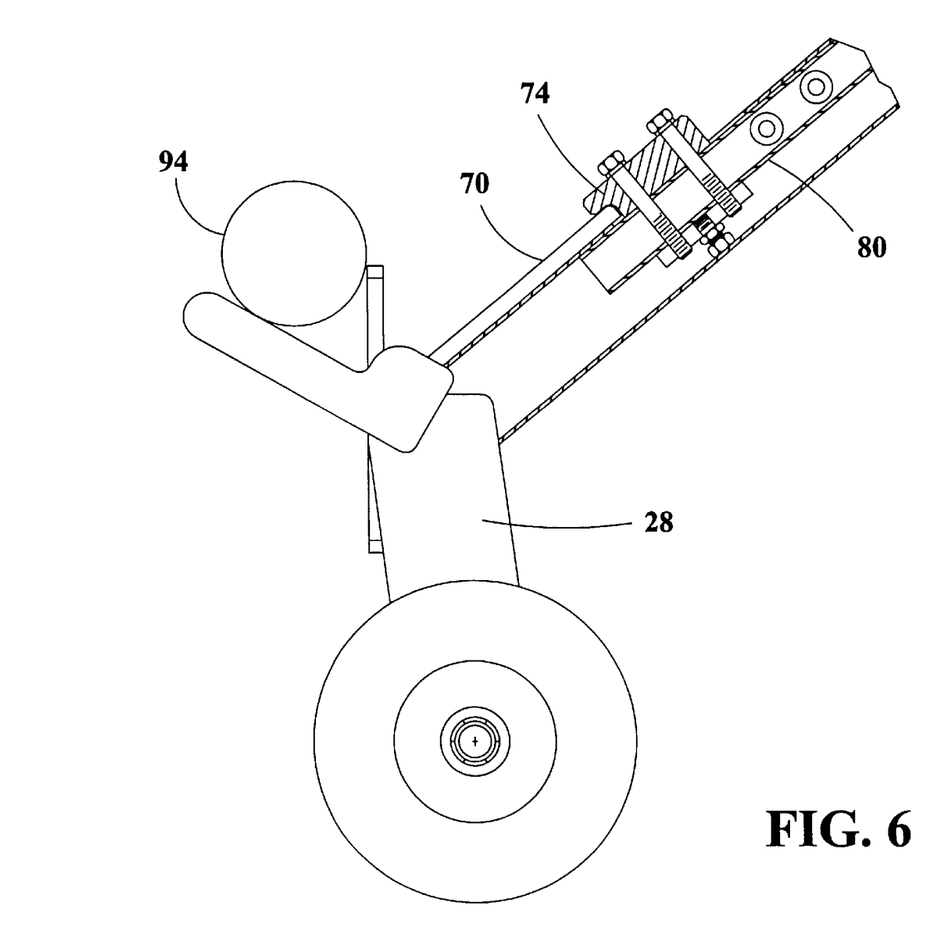
FIG. 6 is an enlarged view of the portion of FIG. 2 shown in the circle identified by the number 6.
Figure 7:
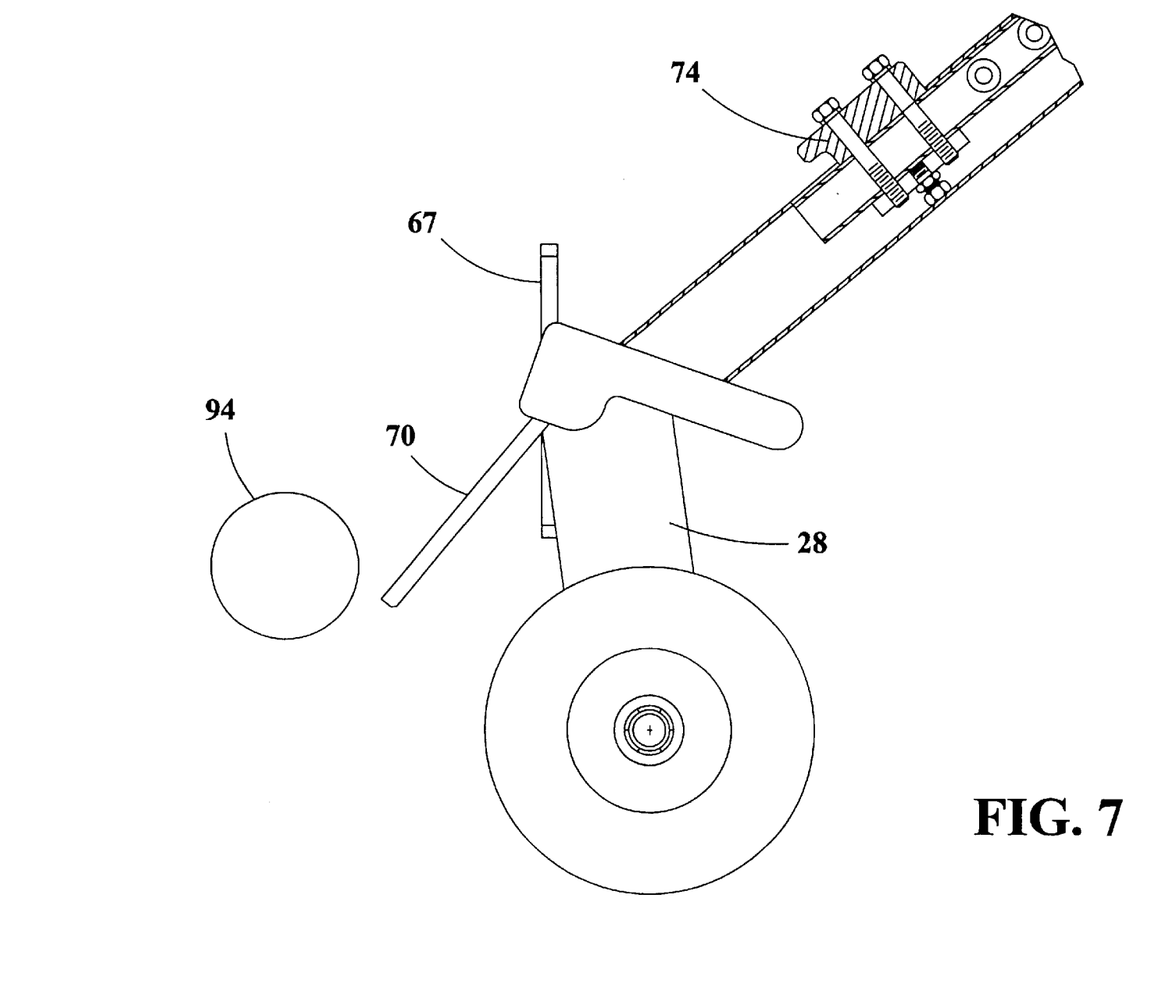
FIG. 7 is a view like FIG. 6 but showing the elements in a different position.

The front end frame portion has a rotatable shaft or axle 56 having first and second end portions 58 and 59 respectively which shaft extends substantially coextensive with the front end frame portion. Each of the first and second end portions of the shaft has an engagement member 62 and 63 respectively attached thereto and movable with the shaft when same is rotated between a first (FIGS. 2 and 6) and a second (FIG. 7) position. First and second stabilizing plates 66 and 67 are mounted in spaced relationship to each other on the front end frame portion 28 for engaging a go-cart identified by the reference numeral 94 in FIGS. 6 and 7. A latchable member 70 is attached to an intermediate portion of the shaft 56 and extends therefrom and is movable between a latched position (FIG. 6) and an unlatched position (FIG. 7) which will be explained further hereinafter. An actuating member 78 (FIG. 5) is mounted near the handle member 34 and is connected by means of a rod or channel member 80 to the latch member 74 so as to enable the latch member to move between the positions of FIGS. 6 and 7.

Figures 8, 8A:
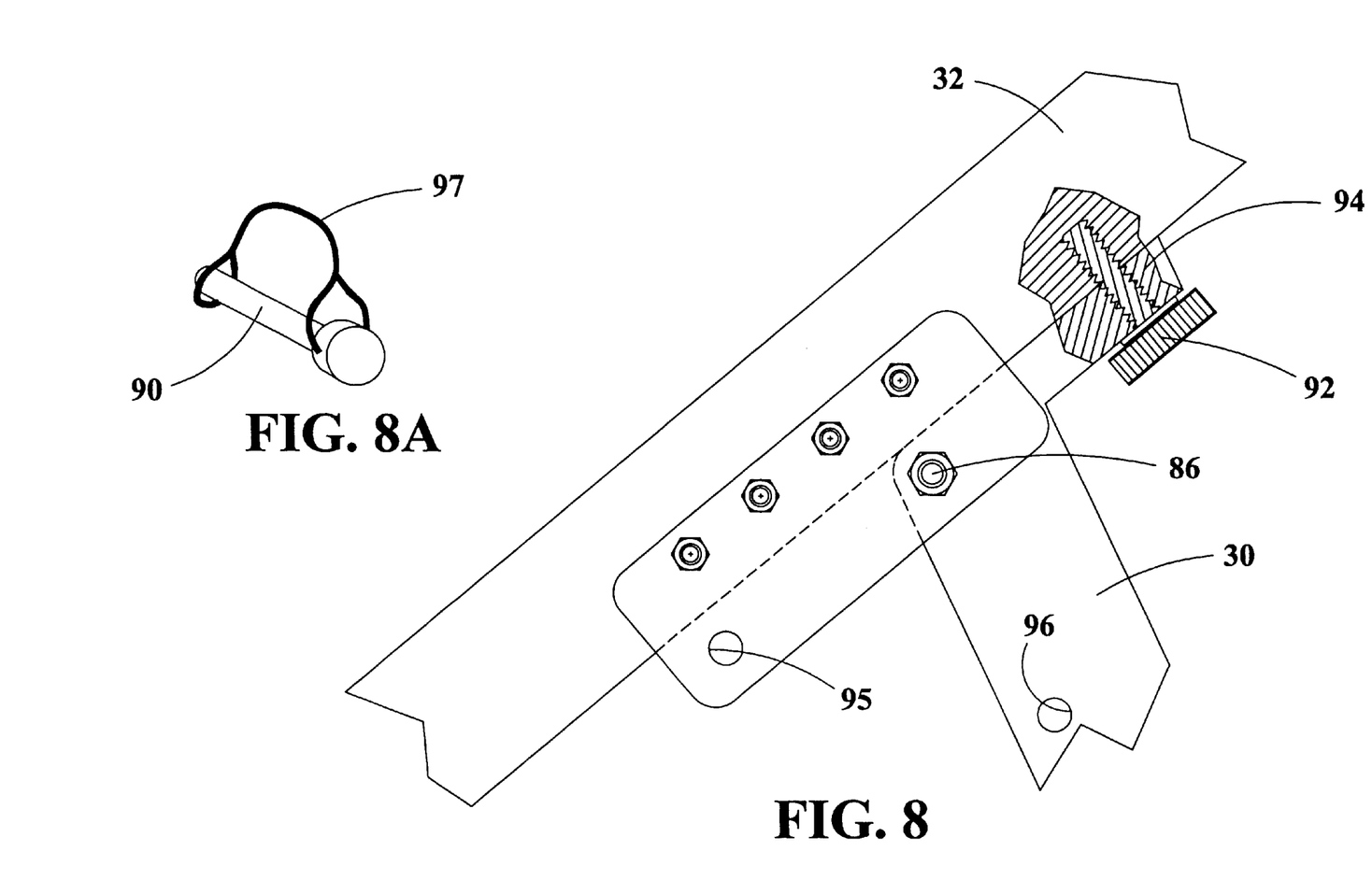
FIG. 8 is an enlarged view of the portion of FIG. 2 shown in the circle identified by the number 8.
FIG. 8A is an isometric view of a pin and a means of securing the same as more particularly shown in FIG. 9.
Figure 9:
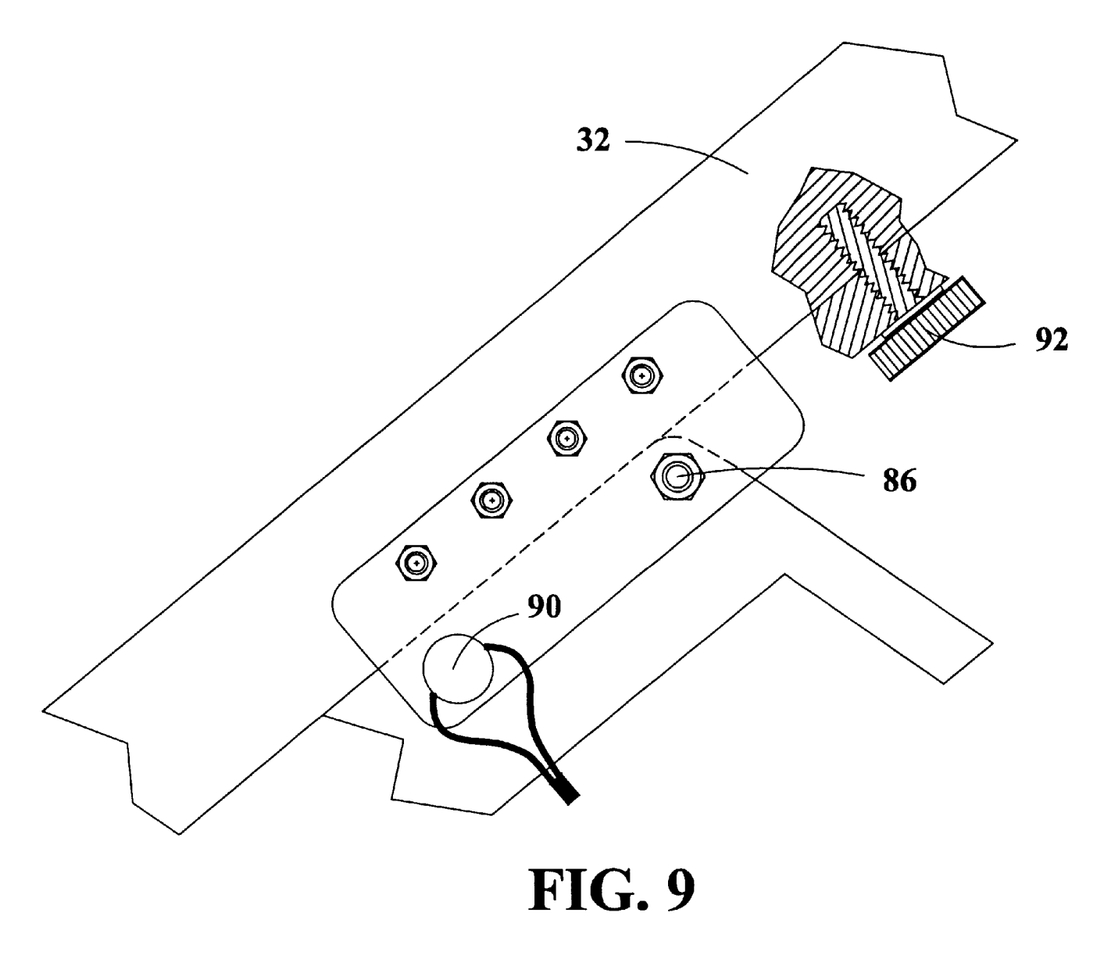
FIG. 9 is a view similar to FIG. 8 but showing the position of some of the elements when the apparatus is in a folded condition.
Figure 10:
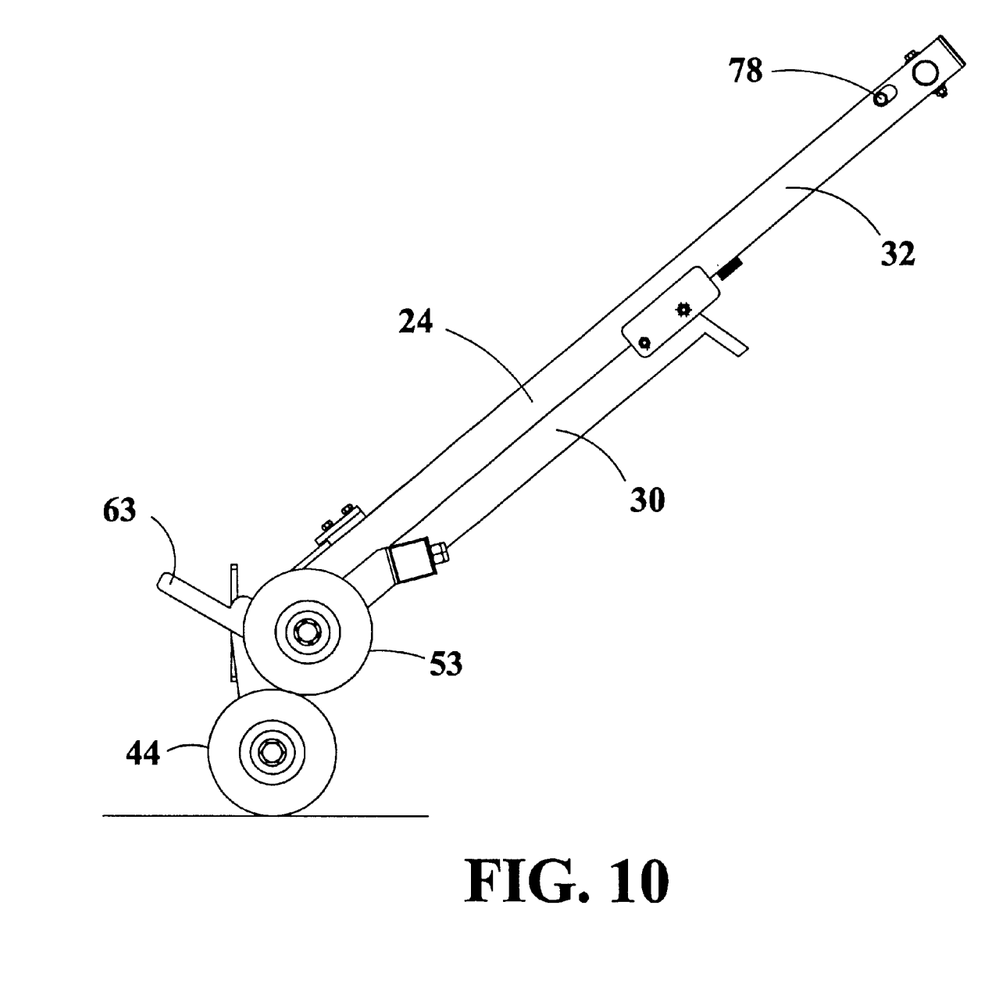
FIG. 10 is a view of the entire apparatus in a positive to be stored or transported.

The rear end frame portion 30 is pivotally connected to the handle portion 32 by means of a pivot member 86 which permits movement of the rear end frame portion 30 from an operative position (FIGS. 2 and 8) to a storage of inoperative position (FIGS. 9 and 10). A securing mechanism 90 is provided for holding the rear end frame portion 30 in the storage position. In the operative position the frame portion 30 is held in position by means of a holding screw 92 extending through an opening in an extension 94 of the frame portion 30 and thence into the handle portion 32. To permit movement to the storage position of FIGS. 9 and 10 the screw 92 is removed and stored as shown in FIG. 9 and the rear end frame portion 30 is pivoted to the position of FIG. 10 and the securing pin or mechanism 90 is inserted through aligned openings 95 and 96 respectively in the handle portion 32 and the rear end portion 30. A wire member 97 insures that the pin 90 stays in place.

The apparatus of the present invention may be used if desired as explained in the following description. Referring specifically to FIGS. 2 and 5–7, one or more persons would grasp the handle 32 and raise it upwardly so as to enable the engagement members 62 and 63 to be located under the frame 94 of a go-cart to be started. The handle 32 is then lowered by pushing downwardly so as to lift the rear of the go-cart off of the ground. The apparatus 20 is then pushed rapidly down the pavement or the course the go-cart is to travel until sufficient speed is attained at which time the actuating member 78 is moved upwardly against the urging of the spring 79. This causes the latch member 74 to move upwardly releasing latchable member 70 and the weight of the go-cart causes movement of the engagement members 62 and 63 to the position of FIG. 7. The inertia of the go-cart hitting the ground causes the engine to start because the rear wheels are directly connected to the engine through the drive train.

When it is desired to store or transport the apparatus of the present invention it is simply necessary only to move the mechanism to the position of FIG. 10.

As a result of the above it will be readily seen that the objects of the present invention as recited above are accomplished. The apparatus provides for the convenient and efficient starting of a direct drive go-cart This is accomplished by lifting the rear end of a go-cart and propelling it along a track and when sufficient speed has been attained, dropping the rear end causing the wheels by way of the drive train to start the engine. The apparatus can also be folded into a compact configuration for storage or transportation.

Although the invention has been described in its preferred form with a certain degree of particularity, it is understood that the present disclosure of the preferred form has been made only by way of example and that numerous changes in the detail of construction and the combination and arrangement of parts may be resorted to without departing from the spirit and the scope of the invention as hereinafter claimed.

What is claimed is:

1. Apparatus for starting a direct drive go-cart which includes in combination a frame having front and rear end portions, a handle portion, an engine, drive train, and front and rear ground engaging wheels, said rear wheels being connected to the engine through the drive train, said apparatus adapted to lift said back end portion off the ground and to be pushed in a forward direction by a user until sufficient speed is attained at which time the back end portion of the go-cart is released, wherein the inertia from the go-cart hitting the ground and continued pushing causes the ground engaging wheels to start the engine, by way of said drive train, a handle member mounted to said handle portion of said frame, said front end frame portion having a first laterally extending support member with first and second portions, ground engaging wheels attached to each of said first and second portions, said rear end frame portion having a second laterally extending support member with third and fourth portions, ground engaging wheels attached to each of said third and fourth portions, said front end frame portion having a rotatable shaft with first and second end portions which extends substantially coextensive with said front end frame portion, each of said first and second end portions of said shaft having an engagement member attached thereto and movable with said shaft when said shaft is rotated between a first and second position, first and second stabilizing plates mounted in spaced relationship to each other on said front end frame portion for engaging a go-cart, a latchable member attached to an intermediate portion of said shaft and extending therewith, a latch member mounted on said frame between said handle portion and said front end portion and movable between first and second positions, an actuating member mounted near said handle member and connecting by means of a rod to move said latch member from said first to said second position, a spring urging said latch member to said first position, said rear end frame portion being pivotally connected to said handle portion of said frame to permit movement of said rear end frame portion from an operative position to a storage position, a securing mechanism for holding said rear end frame portion in a selected one of said operative and storage position.

2. Apparatus for starting a direct drive go-cart which includes in combination a frame having front and rear end portions, an engine, a drive train and a handle portion, said front end frame portion having ground engaging wheels attached thereto, said rear end frame portion having ground engaging wheels attached thereto, said rear wheels being connected to the engine through the drive train, said apparatus adapted to lift said back end portion off the ground and to be pushed in a forward direction by a user until sufficient speed is attained at which time the back end portion of the go-cart is released, wherein the inertia from the go-cart hitting the ground and continued pushing causes the ground engaging wheels to start the engine, by way of said drive train, said front end frame portion having a rotatable shaft with first and second end portions mounted thereon which extends substantially coextensive with said front end frame portion, each of said first and second end portions of said shaft having an engagement member attached thereto and movable with said axle when same is rotated between a first and second position, a latchable member attached to an intermediate portion of said shaft and extending therefrom, a latch member mounted on said frame between said handle portion and said front end portion and movable between first and second positions, an actuating member mounted on said handle portion and connected to said latch member, a spring urging said latch member to said first position, said rear end frame portion being pivotally connected to said handle portion of said frame to permit movement of said rear end frame portion from an operative position to a storage position, a securing mechanism for holding said rear end frame portion in a selected one of said operative and storage position.

3. Apparatus for starting a direct drive go-cart which includes in combination a frame having front and rear end portions and a handle portion, front and rear ground engaging wheels attached to said frame, said rear wheels being connected to the engine through the drive train, said apparatus adapted to lift said back end portion off the ground and to be pushed in a forward direction by a user until sufficient speed is attained at which time the back end portion of the go-cart is released, wherein the inertia from the go-cart hitting the ground and continued pushing causes the ground engaging wheels to start the engine, by way of said drive train, said front end frame portion having an engagement member movable between a first and second position, a latchable member operatively connected to said engagement member, a latch member mounted on said frame between said handle portion and said front end portion and movable between latched and unlatched positions, an actuating member mounted on said frame member and connected to said latch member to move the same to unlatched position.

* * * * *